SPEECH ANALYZER FOR SPEECH RECOGNITION SYSTEM

Filed Jan. 22, 1965 12 Sheets-Sheet 1

INVENTOR
GENUNG L. CLAPPER

BY Andrew Taras

AGENT

SPEECH ANALYZER FOR SPEECH RECOGNITION SYSTEM

SPEECH ANALYZER FOR SPEECH RECOGNITION SYSTEM

Filed Jan. 22, 1965 12 Sheets-Sheet 4

F.S. INVERTER INTEGRATOR
70

V.S. INVERTER INTEGRATOR 70a

United States Patent Office 3,368,039
Patented Feb. 6, 1968

3,368,039

SPEECH ANALYZER FOR SPEECH RECOGNITION SYSTEM

Genung L. Clapper, Vestal, N.Y., assignor to International Business Machines Corporation, New York, N.Y., a corporation of New York Filed Jan. 22, 1965, Ser. No. 427,371
9 Claims. (Cl. 179—1)

ABSTRACT OF THE DISCLOSURE

The system employs formant locating means which detect rising, falling and invariant formants in the speech spectrum to yield a total of 40 speech vectors (speech measures) constituting the vowel characteristics. A network responsive to the formant locating means and to fricative and voice detecting means provide four basic consonant measures which are classified as follows: (1) fricatives and sibilants; (2) voiced or liquid consonants; (3) voiced fricatives; and (4) unvoiced aspirants. These four speech classes are recombined with the different formant energies to provide fifteen different consonant speech characteristics.

The present invention relates to speech analysis and speech recognition systems and, more particularly, to a system for detecting formant transitions and recognizing consonants.

The increasing demands for voice recognition systems stem from the necessity to speed up data communications in all phases of industry, particularly in real time operations where voice communication is involved.

The voice responsive systems of the prior art have had a limited degree of success in areas where voice recognition and response were limited to specific sounds, particularly those employed to identify numeric characters, some alphabetic words and, to a limited extent, a few chosen words. Improvements in these systems have been made to accommodate a corresponding increase in the number of words employed; however these improvements were made possible only by the use of more and cumbersome apparatus for speech recognition and for storage facilities. In spite of these improvements, the systems were limited to voices having very closely related characteristics, and variations or slight departures from these characteristics caused a corresponding decrease in the effectiveness of the system. To improve the effectiveness of these systems, adjustable apparatus was added as a means for compensating losses arising from speech variations of the same spoken words.

Still further improvements in the prior art devices yielded greater resolution and the ability to accommodate variations in the speech characteristics of different individuals, with the result that the apparatus was capable of analyzing and recognizing a greater number of different words. The increased capabilities of these systems were attended by an increase in the storage capabilities, which were oftentimes cumbersome and expensive.

The present invention avoids the limitation of these prior art systems by employing a ssytem that detects formant transitions on the basis of single coordinates as opposed to systems which detect formant transitions on the basis of frequency and time coordinates. Additionally, the present invention includes fricative and voice sensing apparatus for detecting consonant conditions in these formants, thereby yielding voice characteristics that are more meaningful and that can be readily assembled in a code system much more compact than that employed in the prior art systems.

As previously defined in U.S. application 291,344, to G. L. Clapper, filed June 28, 1963, and assigned to the common assignee, a formant is a series of interrelated energy peaks or local maxima. In the speech frequency band of the sound spectrum, for any given instant of time, there are usually from one to four such energy concentrations or formants formed by the oral and nasal passages of the human sound generating system. As words are formed, these concentrations of energy shift about, merge or fade out completely.

Accordingly, the principal object of the present invention resides in an improved speech recognition system providing a greater amount of significant speech characteristics in more compact form, thereby requiring less storage facilities than that employed in prior art speech recognition systems.

Another object is to develop those voice characteristics which are necessary to the recognition of "what was said" rather than "who said it."

A further object is to detect certain characteristics in speech sounds that enable recognition of consonant sounds, thereby providing a more accurate identification of the spoken word.

Yet another object resides in the provision of novel means and a novel approach for combining formant characteristics with fricative and voice energies to yield speech characteristics representing the consonant sounds in the speech spectrum.

The foregoing and other objects, features and advantages of the invention will be apparent from the following more particular description of preferred embodiments of the invention, as illustrated in the accompanying drawings.

Figure 15A:
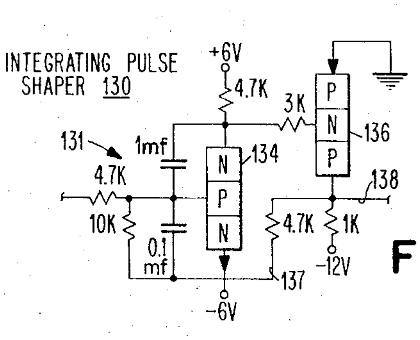

FIG. 15*a* is a detail of an integrator pulse shaper.

Figure 15B:
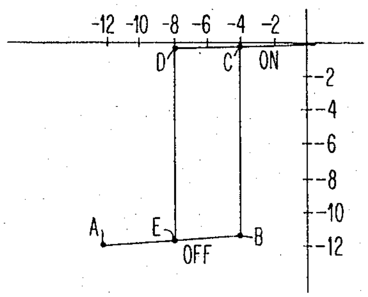

FIG. 15*b* shows a hysteresis loop.

Figure 16A:
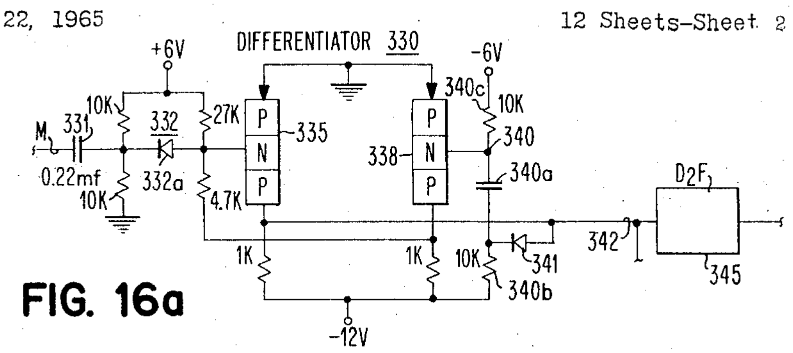

FIG. 16*a* is a detail of the differentiator circuit.

Figure 16B:
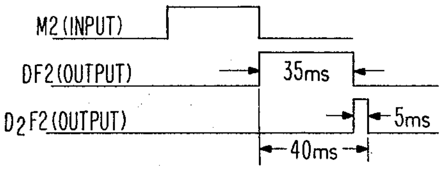

FIG. 16*b* is a timing diagram showing the action of the differentiators.

Figure 17:
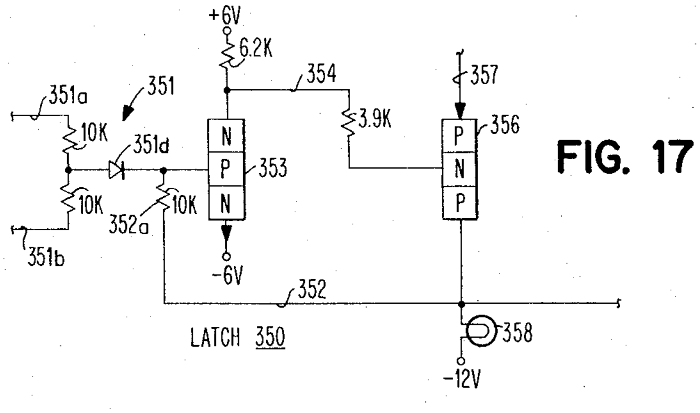

FIG. 17 is a detail of a latch.

Figure 18:
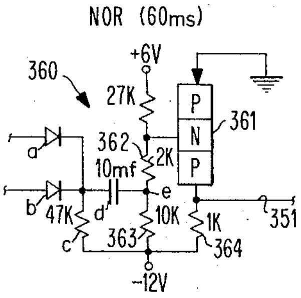

FIG. 18 is a detail of a NOR circuit connected to the outputs of the storage latches.

Figure 19:
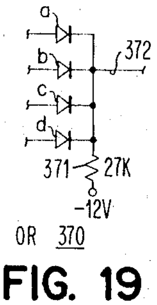

FIG. 19 is a detail of an OR circuit.

Figure 20:
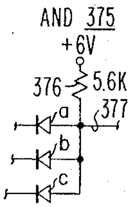

FIG. 20 is a detail of an AND circuit.

Figure 21:
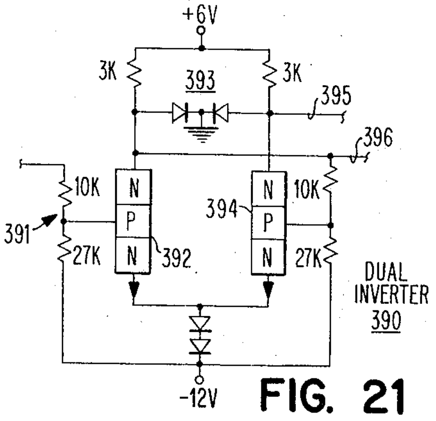

FIG. 21 is a detail of a dual inverter.

Figure 22:
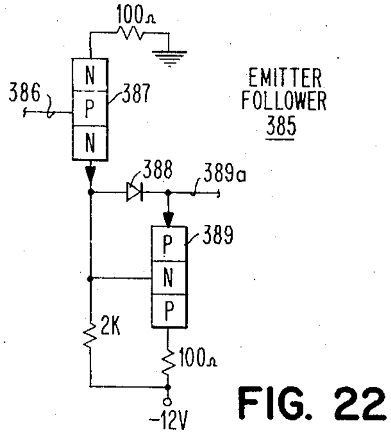

FIG. 22 is a detail of an emitter-follower circuit.

Figure 23:
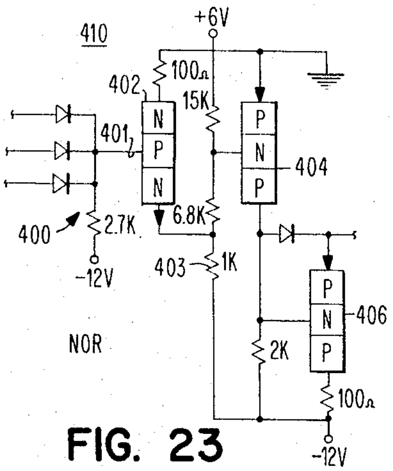

FIG. 23 is a detail of a NOR circuit connected to the output of the dual inverters.

In the aforementioned application, Ser. No. 291,344, formants are detected and stored in a matrix in which reference coordinates are based on frequency and time. Good speech recognition has been achieved with this system, but the memory requirements are large. Moreover, the detection of consonants was relatively difficult and, in some instances, inaccurate.

In the instant invention, novel means are employed to detect and provide a simpler registration of formant transitions. Furthermore, fricative and voice sensing means are combined with formant local maxima to detect consonant conditions, thereby yielding coded voice characteristics which are more meaningful to recognition. It has been found that the codes produced by this system do not vary as much from speaker to speaker as codes produced by the formant locating systems of the prior art.

*General description*

Figure 1:
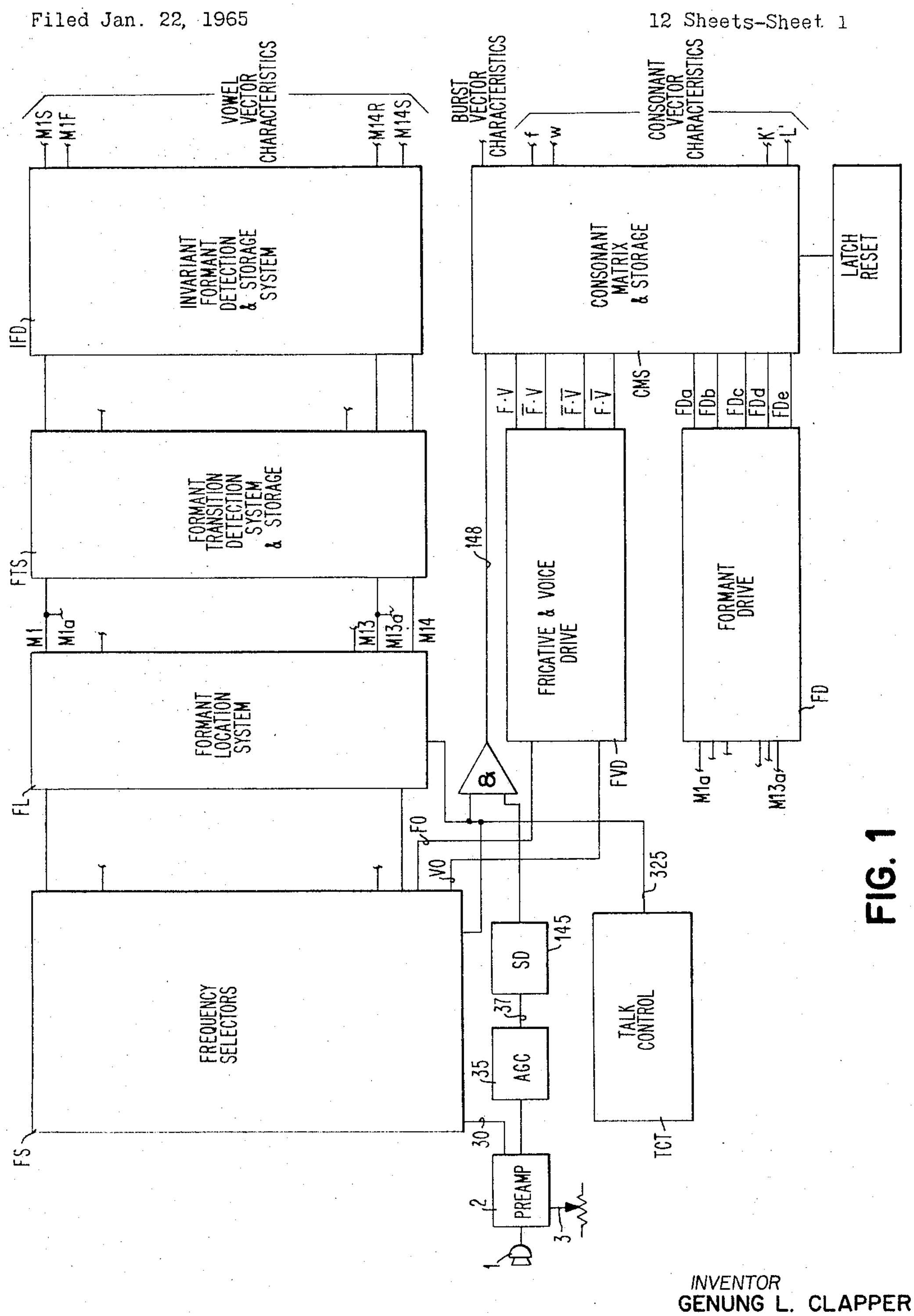
FIG. 1 is a schematic drawing of the system showing the principal sections of the invention.

A general description of the invention will now be given. Referring to FIG. 1, voice sounds or sounds within the speech spectrum enter the system by way of a microphone 1 which transforms the speech sounds to electrical energy, in turn amplified by pre-amplifier 2. An input sensitivity control means 3 is provided to reject background noise. The preamplifier 2 communicates with an automatic gain control means 35 which keeps the gain adjusted dynamically to hold the output of the pre-amplifier at a constant level. This output is in the form of a compressed speech envelope which is applied to an output line 30 connected to a frequency analyzing system FS wherein are contained a plurality of frequency selectors, each of which is tuned to a particular band of frequencies lying in a range extending from 3,750 c.p.s. to 260 c.p.s. The speech spectrum is divided symmetrically about 1,000 cycles when plotted on a logarithmic scale. In addition there is provided a fricative selector which is essentially a broadband, high-pass filter and covers the range of from 4,000 c.p.s. to 10,000 c.p.s. There is also a voice selector which is essentially a broad-band, low-pass filter covering the range from 100 c.p.s. to 250 c.p.s. The range of the spectrum from 250 c.p.s. to 3,750 c.p.s. is divided into 14 bands to which the frequency selectors are tuned. By virtue of these frequency selectors and associated means to be described in detail later on, local maxima (formants) corresponding to the peak energies present in the voice spectrum are detected by a formant location system FL (which includes rectifiers, balance detectors, AND circuits and integrating pulse shapers). The presence of these formants are transmitted to a formant transition detection system and storage means FTS, wherein formant transitions from one band to another are detected by a process of time differentiation and time-coincidence comparison. This transition detection system also contains appropriate storage latches for storing the transient formants. Formants which appear as steady state energy levels are detected in an invariant formant detection and storage means IFD. Generally speaking, as formants are developed, transitions may occur as follows:

(1) A local maximum, M*i*, may terminate and the next lower adjacent frequency band may begin a transition, M*j*. The transition from M*i* to M*j* is classed herein as a falling transition and is designated M*i*F. This transition is stored in a latch appropriately designated (F).

(2) A local maximum, M*i*, may terminate and the next higher adjacent frequency band may begin a transition, M*h*. The transition from M*i* to M*h* is classified as a rising transition and is designated M*i*R. This transition is stored in a latch appropriately designated (R).

(3) A local maximum, M*i*, may terminate and neither the adjacent upper band nor the adjacent lower band undergoes a transition at the termination of the local maximum, in which event the local maximum, M*i*, is classed as being in the steady state and is designated M*i*S. This local maximum is stored in a latch appropriately designated (S).

The detection of the termination of formants is accomplished by a plurality of differentiators DF's (14 in all), one for each hand of frequencies constituting the voice spectrum. A second set of differentiators, designated $D_2F$'s (14 in all), in combination with other means to be described, is employed to detect the presence of steady state (invariant) formants.

The outputs of these differentiators are fed into their respective latches to provide indications of: falling, rising and steady state transient conditions indicative of vector quantities, 40 in all, representing speech vowel action in the speech spectrum.

The invention is also provided with means for detecting energies indicative of speech characteristics representing the consonant sounds in the speech spectrum. Referring to FIG. 1, the energies representing the fricative and voice sounds are fed into their respective frequency analyzers, the outputs from which are directed through a first integrating means and, thereafter, through a second integrating means. The fricative output FO and the voice output VO are fed into a fricative and voice drive means FVD in which dual inverting means and associated coincidence logic units are provided to issue signals representing the following fricative and voice energy states:

(1) $F\cdot\overline{V}$—fricative energy without voice energy;
(2) $\overline{F}\cdot V$—voice energy without fricative energy;
(3) $F\cdot V$—both fricative and voice energy simultaneously; and
(4) $\overline{F}\cdot\overline{V}$—neither fricative nor voice energy present.

These four conditions represent the four major consonant classes:

(1) fricatives and sibilants—f, s, sh, k, t, ch;
(2) voiced or liquid consonants—w, b, g, m, l, y;
(3) voiced fricatives—v, z, zh, j, dj, d; and
(4) unvoiced aspirates—h, soft k, p.

The consonants are further described by the presence or absence of burst energy which is detected by monitoring the slope of the automatic gain control (AGC) signal, this being accomplished by passing the output of the AGC means 35 on line 37 to slope detector 145, whose output is gated through AND circuit 120*r* to line 148 and stored in an appropriate latch in a consonant matrix and storage means CMS. The consonant matrix and storage means CMS combines the formant energies issued by the formant location system FL with the four conditions representing the consonant classes, to provide a total of fifteen vectors representing the various consonant sounds in the speech spectrum. The formant energies are transmitted via five lines FD*a* through FD*e* into the consonant matrix CMS under control of a formant drive means FD into which the formants are entered via lines M1*a* through M13*a*. The burst signal on line 148 is also stored in an appropriate latch to provide an additional bit of information for consonant recognition. This embodiment of the present invention accordingly provides 56 vector quantities representing all of the speech characteristics describing each speech event to be recognized.

Before presenting a description of the over-all operation of the invention, it might be well to consider the details of the various components used throughout the entire specification. These components comprise: the pre-amplifier the automatic gain control (AGC), frequency selectors, the fricative selector, the voice selector, inverter-integrators for the fricative selector and the voice selector, rectifiers, balance detectors, AND circuits, emitter-followers, integrating pulse shapers, differentiators, NOR circuits, OR circuits, dual inverters, latches, talk control trigger, and delay circuits.

*Pre-amplifier*

Figure 3:
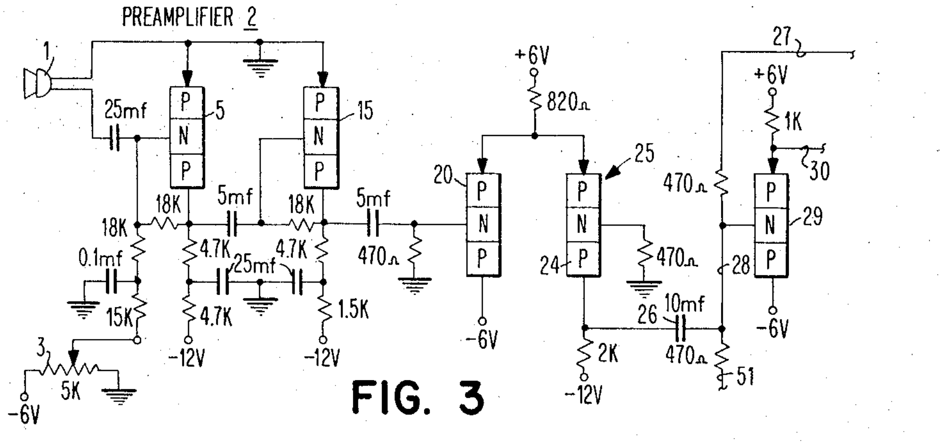
FIG. 3 shows the details of the pre-amplifier.
Figure 4:
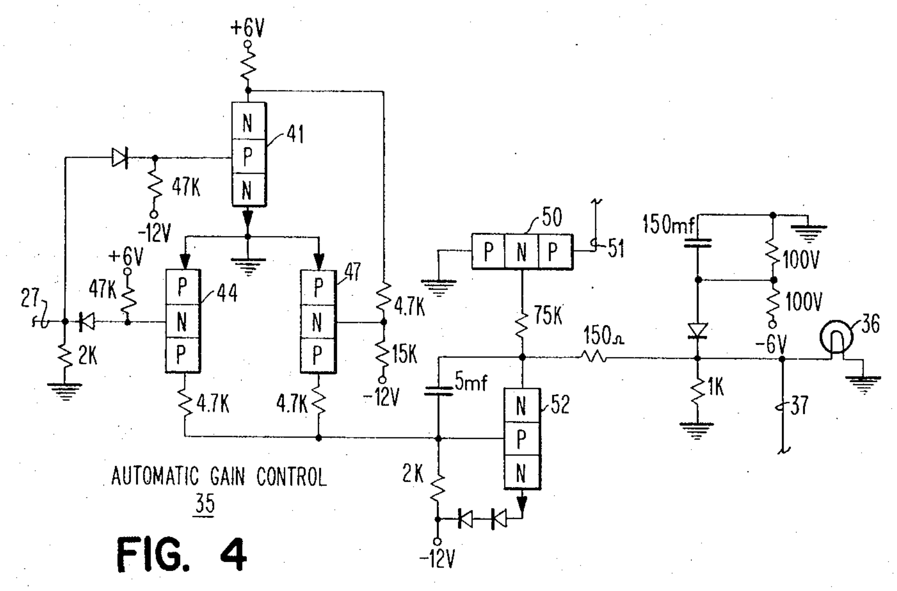
FIG. 4 shows the details of the automatic gain control.

The function of the pre-amplifier 2 is to amplify the low level signals received from the microphone 1 and to provide, in conjunction with an automatic gain control means, to be described, a uniform output. Referring to FIG. 3, the pre-amplifier comprises essentially five PNPtype transistors, 5, 15, 20, 25 and 29, in the network shown. The first two transistors 5 and 15 are utilized mainly to amplify the incoming waveforms transmitted by the microphone 1. Sensitivity control means 3 is provided to control the gain of the first transistor 5. The amplified output from the second transistor 15 is coupled to the third transistor 20 which, in conjunction with the fourth transistor 25, forms a voltage amplifier having inherent compression properties. The output of transistor 25 is applied via capacitor 26 to transistor 29 which serves as a driver to provide a low impedance path to frequency selectors F0 through F15 via the line 30. The output of transistor 25 is also applied to the automatic gain control 35 via line 51.

*Automatic gain control*

Figure 5:
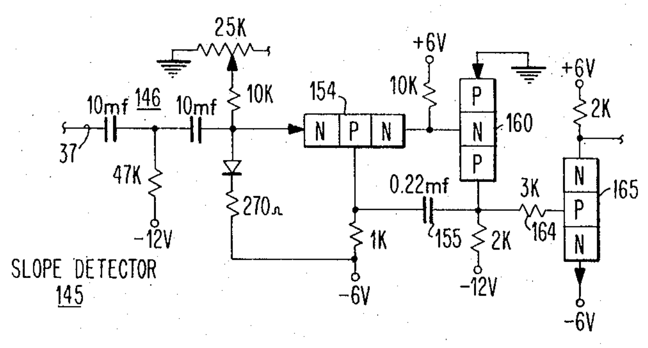
FIG. 5 shows the details of the slope detector.

The function of the automatic gain control 35, shown in FIG. 5, is to develop an automatic gain control voltage which is applied to the pre-amplifier 2 and is also applied across an indicator 36 to provide a visual indication when the voltage exceeds a predetermined threshold limit. This control voltage is conducted across a transistor 50 causing its effective impedance to vary and be transmitted to the pre-amplifier via line 51, specifically, to the base of transistor 29, via line 28, and the collector 24 of transistor 25 by way of the coupling capacitor 26.

The normal operation of the automatic gain control circuit is set to plus or minus .4 volt, the range at which the sensitivity control means 3 in the pre-amplifier 2 is set. The maximum range the automatic gain control can be overdriven is plus or minus .5 volt, and the threshold value is established at plus or minus .3 volt. When a positive excursion exceeds .3 volt, transistor 41 is rendered conductive to cause transistor 47 to conduct, the latter providing an output to integrator transistor 52. Conversely, when a negative excursion exceeds .3 volt, transistor 44 conducts to apply a corresponding input to the integrating transistor 52. The output of the transistor 52 accordingly varies the impedance across the variable impedance transistor 50 and the output from the latter is then reflected, via the line 51, to the input of transistor 29 and to the collector of transistor 25 in the pre-amplifier 2. The output of the transistor 52 is also reflected on output line 37 connected to slope detector 145.

*Frequency selectors*

Each of the 14 frequency selectors 80 functions to provide a very sharp band pass characteristic for a preassigned frequency range as indicated in the following chart:

| Selector | Mean frequency | Range in c.p.s. |
|---|---|---|
| F1 | 3,400 | 3,120–3,750 |
| F2 | 2,840 | 2,590–3,120 |
| F3 | 2,340 | 2,140–2,590 |
| F4 | 1,940 | 1,765–2,140 |
| F5 | 1,590 | 1,458–1,765 |
| F6 | 1,325 | 1,192–1,458 |
| F7 | 1,060 | 970–1,192 |
| F8 | 880 | 800–970 |
| F9 | 720 | 655–800 |
| F10 | 590 | 535–655 |
| F11 | 480 | 444–535 |
| F12 | 408 | 375–444 |
| F13 | 340 | 312–375 |
| F14 | 284 | 260–312 |

Figure 6:
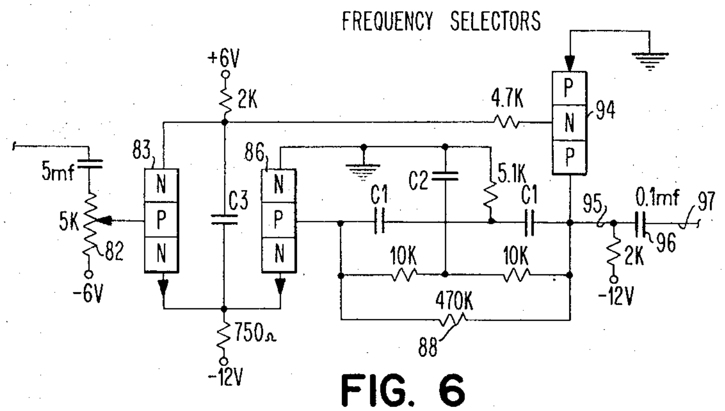
FIG. 6 shows details of an active type of one of 14 frequency selectors.

Referring to FIG. 6, the frequency selector 80 comprises transistors 83 and 86 which operate as a difference amplifier, a twin-T filter network and an output amplifier transistor 94. In operation, the audio input from the pre-amplifier 2 is applied by way of an attenuator 82 to the transistor 83. The output from the latter is amplified by transistor 94, the output from which is applied to the transistor 86 by way of the twin-T filter network 88. Thus, at all frequencies other than the selected frequency range, inputs at the transistors 83 and 86 are substantially equal, resulting in a relatively low output gain. At the selected frequency, the twin-T filter network 88 passes very little signals so that the output of the amplifier is at a maximum. The output appears on line 95 and is applied to the formant location system via capacitor 96 and line 97.

*Fricative selector*

Figure 10:
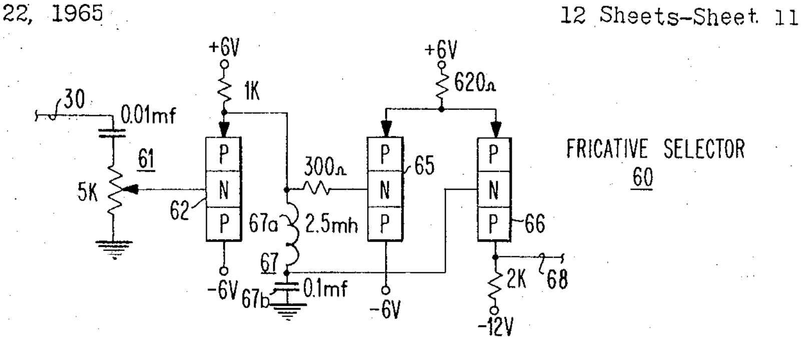
FIG. 10 is a detail of the fricative selector.

Referring to FIG. 10, the fricative selector 60 is used to abstract high frequency noise from the applied audio signal appearing on the line 30. The sibilant selector comprises essentially an attenuator 61, a driver transistor 62 and a difference amplifier consisting of transistors 65 and 66 and a delay network 67 which includes an inductor **67*a* and a capacitor 67*b***. The output of the difference amplifier consists of high frequency noise signals above 4 kc.

*Inverter-integrator*

Figure 11:
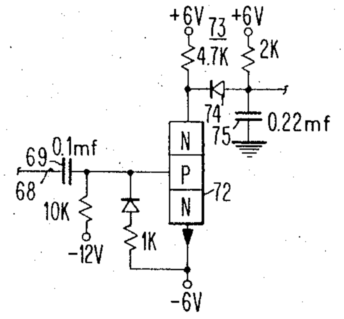
FIG. 11 is a detail of an integrator-inverter connected to the fricative selector.

The output from the fricative selector is applied through a capacitor 69 to an inverter-integrator 70, shown in FIG. 11. This inverter-integrator comprises a biasing network whereby a certain threshold limit is established so that only noise signals above this limit will be admitted and applied to transistor 72. The output from the latter is applied to an integrating circuit 73 consisting of a diode 74 and a capacitor 75. The partially integrated signal issued appearing on the integrating circuit 73 is then applied to an AND circuit **120*o***, to be described hereinafter in detail.

*Voice selector*

Figure 12:
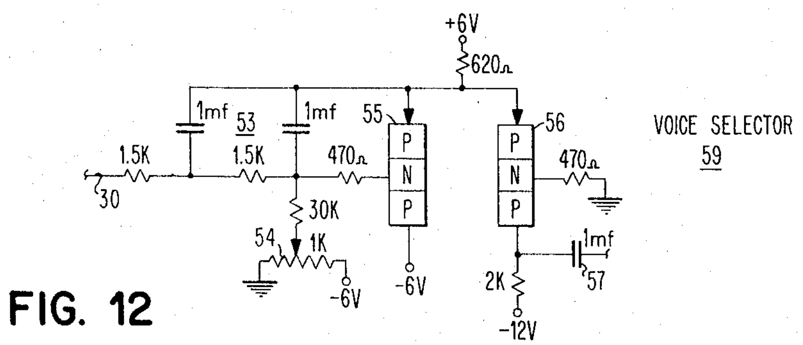
FIG. 12 is a detail of the voice selector.

The voice selector 59 is a broad-band, low-pass filter designed to cut off below 100 cycles in order to eliminate the 60-cycle hum. The voice selector covers the range of voice frequencies from 100 cycles to 250 cycles for both men and women. It is highly sensitive to speech actions such as voice stops; that is, voice actions with the lips compressed. Referring to FIG. 12, the voice selector 59 comprises essentially a low-pass, filter network 53 connected to a transistor 55 which functions primarily as an emitter-follower. The output of the latter is fed into a grounded base transistor 56 which functions as a voltage amplifier to provide a clipped sine wave output.

Figure 13:
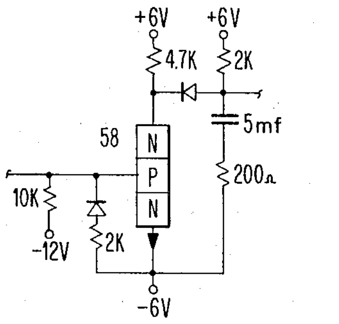
FIG. 13 is a detail of an inverter-integrator connected to the voice selector.

This output is fed to an inverter-integrator **70*a*, shown in FIG. 13, by way of a capacitor 57. The inverter-integrator is essentially an integrating network which includes a transistor 58** that provides a D.C. output level having a relatively small amount of noise.

*Rectifiers, balance detectors, and circuits*

The formant location system is comprised of these three basic components: the rectifier 100, the balance detector 110, and the negative AND configuration 120. The rectifier 100 functions to change the output of the frequency selector to a D.C. level which is proportional to the peak-to-peak A.C. output from the frequency selector.

Figure 7:
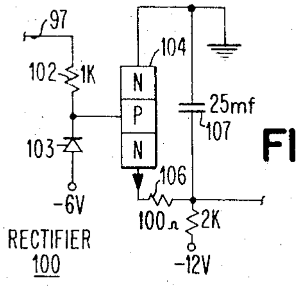
FIG.7 is a detail of the rectifier.

Referring to FIG. 7, the rectifier 100 comprises primarily a limiting resistor 102, a diode 103 and an NPN transistor 104 arranged as an emitter-follower having in its output a limiting resistor 106 and a filter capacitor 107 coupled to ground. The diode 103, in conjunction with the transistor 104, serves as a voltage doubler to charge the filter capacitor 107 to the full peak-to-peak value of the A.C. input.

Figure 8:
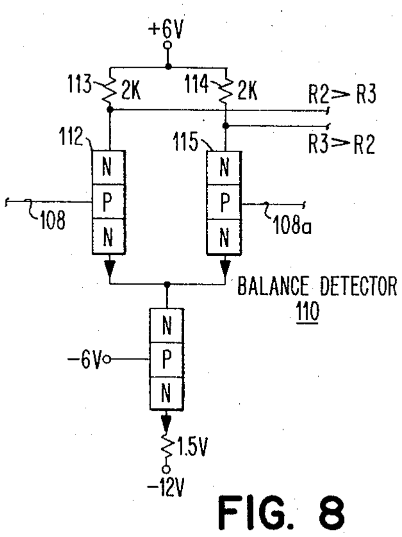
FIG. 8 is a detail of the balance detector.

Referring to FIG. 8, the balance detector 110 comprises transistors 112 and 115 connected in the manner shown, the arrangement serving as a balance amplifier with transistor 117 connected in common to the emitters of transistors 112 and 115. By virtue of this arrangement, transistor 117 serves as a control for limiting current flow through the transistors 112 and 115.

The primary function of the balance detector is to compare the D.C. level outputs from a pair of adjacent rectifiers. For example, one of the rectifier outputs on line 108 from the rectifier R2 is applied to transistor 112 of balance detector No. 2, whereas the output on line 108*a* from the second rectifier R3 is applied to transistor 115. To explain the function of the balance detector, consider first the condition where the D.C. applied levels are of equal magnitude. Under such condition and considering the fact that the function of transistor 117 is to limit the total current flow through transistors 112 and 115 to 4 milliamperes, it follows that, because of the equal D.C. levels, equal currents flow through both transistors 112 and 115, thus limiting the current flow to 2 milliamperes through either of these transistors. The 2-milliampere current flows across associated 2K resistors 113 and 114 to produce a 4-volt drop which places the output at +2 volts above ground, this being considered an inactive condition.

An active condition results when one or the other of two inputs appearing on the lines 108 and 108*a* is greater than the other. For example, consider the input to transistor 112 greater than the input to transistor 115. In this example, transistor 112 will now draw substantially all the current that is controlled through transistor 117, which is approximately 4 milliamperes. Under this condition, the drop across the 2K resistor 113 at the output of transistor 112 is substantially 8 volts to provide an active signal at −2 volts below ground.

Conversely, when the input to the transistor 115 is greater than the input to transistor 112, the current flow through the transistor 115 will cause an 8-volt drop across its output resistor 114, thus providing an active signal of −2 volts below ground.

The active output of the balance detector expresses an inequality between a pair of applied rectifier outputs. For example, balance detector No. 2 provides an output which indicates that rectifier No. 2 output is greater than rectifier No. 3 output (R2>R3) or an indication that rectifier No. 3 output greateh than rectifier No. 2 output (R3>R2).

The negative AND circuits 120 are employed to determine the conjunction of two inequalities representative of a local maximum. The outputs from an adjacent pair of balance detectors; for example, balance detectors No. 2 and 3, are applied to negative AND circuit No. 3 which establishes a local maximum on its output line, indicating that the output of rectifier No. 3 is greater than the output from either rectifier No. 2 or No. 4.

The outputs from the balance detectors (i.e., two outputs from each of the balance detectors 1 through 14) are applied to the negative AND circuits 120.

Figure 2:
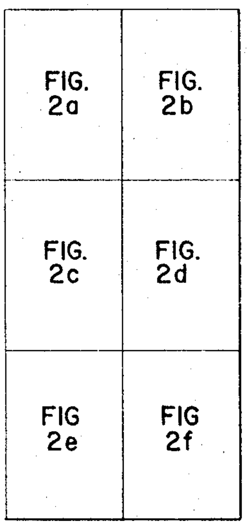
FIG. 2 shows how
Figure 2A:
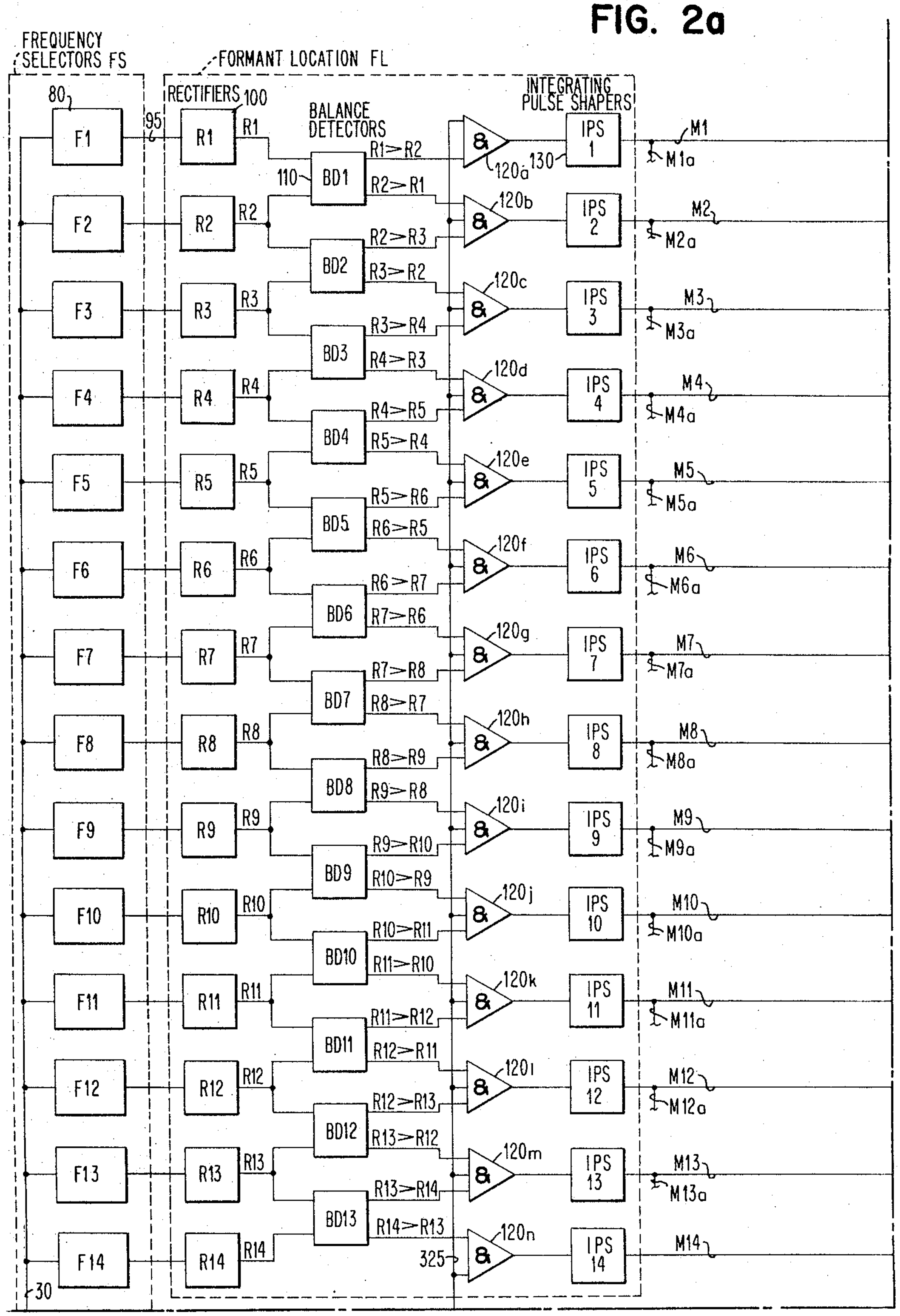
FIGS. 2*a* through 2*f* are assembled to show the details of the system constituting the invention.

As illustrated in FIG. 2*a*, the outputs from the balance detectors 110 are applied to each of the negative AND circuits 120; for example, the outputs from balance detector No. 2 are applied to negative AND circuits No. 2 and No. 3. The functions of the negative AND circuit is to detect the coincidence of the negative active signals issued by the balance detectors.

Figure 9:
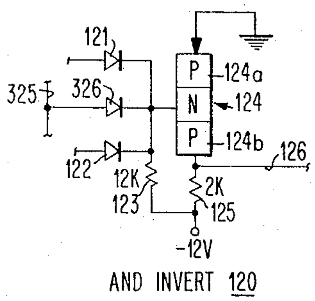
FIG. 9 shows the details of an AND-Invert circuit.

The negative AND circuit 120, as detailed in FIG. 9, comprises an input network consisting of three input diodes 121, 122, and 326; a resistor 123; and a transistor 124, to which the input network is connected as shown.

In operation, consider a condition where both inputs to the negative AND circuit are active (that is, the signal outputs from the balance detectors are constituted of negative signal levels below ground) and a signal is present on the diode 326. Under this condition, all diodes 121, 122, and 326, will be reverse biased, resulting in a current flow through the transistor 124 from emitter 124*a* through base and through the resistor 123 to −12 volts. This causes a current flow through the transistor from emitter through collector 124*b* and through resistor 125 to −12 volts. Due to this current flow, the collector rises to substantially ground level, providing an output on line 126 which output is indicative of the local maximum.

When one or the other of the two inputs to diodes 121 and 122 is positive, at a time when a signal is present in the diode 326, the base of the transistor 124 is raised above ground level, thus cutting off conduction in the transistor, thereby resulting in a drop in the output thereof to substantially −12 volts, this being indicative of the off condition. The outputs representing local maxima from the various negative AND circuits 1 through 14 are applied to the integrating pulse shapers 130, which, as earlier described, function to remove jitter (that is, undesirable transients) from the signals representing local maxima.

*Integrating pulse shaper*

The function of the integrating pulse shaper (IPS) 130 is to remove transients which may be present in the applied incoming signals to provide an integrated and shaped output signal. The IPS 130, as seen in FIG. 15*a*, comprises transistors 134 and 136 with an integrating network 131 at the input of transistor 134 and a feedback loop 137 from the output of transistor 136 to the input of transistor 134. The feedback network includes a resistor divider circuit which provides hysteresis characteristics.

The hysteresis action, as shown in FIG. 15*b*, may be described as follows. A steady rising D.C. signal, when applied to the input network of the IPS, follows the hysteresis loop beginning at a point A on the loop and slowly rises to a point *b* as the voltage increases from a −12 volts value to a value approximately −4 volts. At a voltage slightly exceeding −4 volts, the collector output of transistor 136 rises sharply from point B to point C and any small variation in the voltage at point C will not alter the amplitude of the output voltage at the collector of 136. To turn the output off, the input voltage must be lowered to a value near −8 volts, at which value the output voltage drops sharply from point D to point E on the hysteresis loop.

For A.C. signals, an integrating action takes place by virue of the circuit which includes the input resistor and the capacitor between the base and collector of transistor 134. By virtue of this, A.C. signals are integrated to an effective D.C. input and will have substantially the hysteresis action just explained.

The pulse shaping aspect of this circuit is accomplished through the positive feedback loop 137 extending from the collector of transistor 136 to the base of transistor 134. When the input rises to −4 volts, conduction is established in transistor 134, which causes the collector voltage to drop to a value below ground. The effect of this is to establish conduction in transistor 136 to produce a rise at the collector of transistor 136 which is fed back by way of the feedback loop 137 to reinforce conduction in the transistor 134. This results in a sharp positive excursion for the leading edge of the output waveform on line M. When the input drops to an effective value of −8 volts, the transistor 134 cuts off, causing the voltage at the collector thereof to rise, thereby cutting off conduction in transistor 136. The resultant drop at the collector of transistor 136 is fed back, by way of the feedback loop 137, to reinforce cutting off conduction in the transistor 134. The resultant sharp excursion provides a steep cutoff for the trailing edge of the output waveform. In this manner, the IPS output is a clean waveform which is substantially a square wave with sharp leading and trailing edges.

*Differentiators*

The differentiators DF and $D_2F$ are similar in circuit design, differing only in the time constant that determines the length of the emitted pulse. The differentiators DF and $D_2F$ are referenced respectively DF1 through DF14 and $D_2F1$ through $D_2F14$. The DF unit 330, shown in FIG. 16*a*, comprises an input differentiating circuit 332 with a biased isolating diode 332*a* to prevent operation from noise spikes. Two transistors 335 and 338 form a monostable pulse generating circuit whose output duration is a function of the RC product of the timing circuit 340 associated with the base of transistor 338. Timing capacitor 340*a* is isolated from the output line by a diode 341 so that it does not load the output. This permits the output to drop sharply at the end of a generated pulse, and so provides a good "turn-on" negative transient for the succeeding pulse shaper $D_2F$. This circuit operates in identical fashion to the one just described, except that it provides a shorter output pulse.

In operation, transistor 338 normally conducts by reason of base current flowing from ground through the base-emitter diode of the transistor 338 and through a 10K timing resistor 340*c* to −6 volts. The collector of transistor 338 is held near ground as current flows in the collector load. This cuts off transistor 335 and maintains it in a state of non-conduction through the associated resistor divider to +6 volts, which places the base of the transistor 335 at a voltage approximately 0.9 volt above ground. The other side of the input isolating diode 332*a* is midway between +6 volts and ground or approximately 3 volts above ground. Thus, the isolating diode 332*a* is back biased by at least two volts. A negative input transient of less than two volts will have no effect on the state of conduction of the diode and an input of at least three volts will be required to cause conduction in the transistor. In practice, an input from 9 to 12 volts will be provided assuring the turn-on current for transistor 335. When such a negative-going transient appears at the input to the differentiator, transistor 335 conducts and a positive-going transient from −12 volts to ground appears at its collector. This is coupled by diode 341 to the negative side of the 3.3-microfarad timing capacitor 340*a* and through the capacitor to the base of transistor 338. The sharp rise at the base of transistor 338 cuts off collector current flowing therein and the collector drops sharply, enforcing and maintaining conduction in transistor 335 for as long as transistor 338 is cut off. The duration of the output pulse is thus a function of the value of the timing capacitor 340*a* and the 10K resistor 340*c*. In approximately 35 milliseconds, the voltage at the base of transistor 338 drops to about ground and conduction is reinstated in transistor 338. The rise at the collector cuts off transistor 335 and its collector drops sharply to terminate the output pulse. The output diode 341 decouples the timing circuit at this time and the timing capacitor continues to charge through the 10K resistor to −12 volts. The negative transient at the output of the DF unit 330 causes the $D_2F$ unit 345 to emit a 5-millisecond pulse because of the smaller timing capacitor in the latter. Thus, a 35-millisecond output pulse from the DF unit is followed by a 5-millisecond pulse from the output of the $D_2F$ unit whenever an input pulse ends. The differentiators DF1 through DF14 are employed to emit a 35-millisecond pulse when the termination of a local maximum is detected for a particular band of frequencies. The termination of this 35-millisecond pulse is detected by the differentiators $D_2$F1 through $D_2$F14 and each accordingly issues a 5-millisecond pulse.

*NOR circuit (for formant transients)*

As previously described, the transition storage latches are set by a coincidence of a DF pulse, indicating the end of a given local maximum, and a pulse representing an adjacent local maximum. The turning on of a transition storage latch inhibits the turning on of the corresponding steady state latch. The inhibiting action is accomplished during a period of 60 milliseconds, after a transition latch has been set, by means of a 60-millisecond NOR circuit, shown in FIG. 18. In this circuit, transistor 361 is normally conducting by reason of base current flowing in the base-emitter diode of the transistor. Base current flows from ground through the emitter base diode and thence through a divider, including resistors 362 and 363 to −12 volts. Collector current then flows through a 1K resistor 364 to the −12 volt source. The collector, as a result, is held at near ground potential, activating line 351 which serves as an input to a steady state latch to be described later hereinafter. An input capacitor 360*d* to the NOR circuit is charged to about 10 volts, the positive side thereof being at about −2 volts and the negative side near −12 volts. When either of the diode inputs 360*a* or 360*b* are raised by a transition latch turning on, the lower side of the capacitor 360*d* is driven to near 0 volts. This 12-volt rise is coupled to the divider point 360*e* which rises from −2 volts to +10 volts, approximately. This action cuts off the transistor and the voltage at the output line 351 drops to −12 volts. The capacitor 360*d* now discharges and the voltage at the base of the transistor drops to about ground, causing a resumption in conduction through the transistor. This action takes about 60 milliseconds and provides sufficient time to prevent setting up a steady state latch from a $D_2F$ pulse.

*AND, OR circuits*

FIGS. 19 and 20, respectively, show circuit configurations for an OR and an AND function. The OR configuration consists of a plurality of input diodes 370*a* to 370*d*, connected to a common resistor 371, in turn connected to −12 volts. An input pulse to any diode causes an output signal to be impressed on line 372.

The AND configuration 375, shown in FIG. 20, comprises input diodes 375*a*, 375*b* and 375*c*, connected to a common resistor 376, in turn connected to a +6 volt source. A coincidence of pulses on all the input diodes provides an output on the output line 377.

*Emitter-follower*

The emitter-follower EF, shown in FIG. 22, is used primarily as a push-pull emitter-follower driver of the type described in a pending application Ser. No. 291,344; filed June 28, 1963; to G. L. Clapper. The emitter-follower comprises a pair of transistors 387 and 389. The base of the transistor 387 is fed from the output of the AND circuit previously described and the emitter thereof is fed directly to the base and collector of transistor 389 and also through a diode 388 to the emitter of transistor 389 and also to the output of line 389*a*. In this arrangement, transistor 389 acts as a variable impedance changer to match load conditions so that the transistor 387 may operate efficiently as the emitter-follower. The latter also provides positive current drive while the transistor 389 provides negative current drive to operate loads of relatively heavy D.C. or to discharge line capacitance rapidly.

*NOR circuit*

A NOR circuit 410, shown in FIG. 23, comprises a conventional OR circuit 400 provided with three inputs and an output line 401 connected to the base of a transistor 402, which functions as an emitter-follower to provide the proper impedance matching characteristics to the input of a pair of transistors 404 and 406, which function as a power push-pull inverter.

In operation, when all of the inputs to the OR circuit 400 are negative, the transistor 402 is near cut off while the transistor 404 conducts as base current flows into the load resistor 403 of transistor 402. With transistor 404 conducting, a transistor 406 is held near cut off while transistor 404 supplies positive current to the load. When any input to the OR circuit rises, transistor 402 conducts and cuts, off base current to transistor 404, thereby cutting the latter off and allowing base current to flow in transistor 406. As a result, the output drops to a negative, OFF, level and transistor 406 provides negative current to the load as required. This NOR circuit 410 not only provides a continuous output, but also has a power drive feature which makes it possible to drive many other logic circuits shown in the consonant matrix system. The action of this NOR circuit 410 differs from that previously described for the formant transients in that the former circuit had a temporary output only, whereas this circuit has an output for the total duration of the inputs.

*Slope detector*

The slope detector 145 scans the automatic gain control waveform for the presence of sharp negative transients, on line 37, which are indicative of sudden bursts in voice intensity. The slope detector, as shown in FIG. 5, comprises an input network 146 and transistors 154, 160 and 165. Transistor 154, in conjunction with the input network 146, conducts, as a function of the negative slope in the output waveform on the line 37, the output from the automatic gain control. If the slope of the waveform is great enough, current will flow in an amount sufficient to cause conduction through transistor 160 with the result that this transistor 160 emits a positive-going pulse which is fed back, by way of capacitor 155, to the base of transistor 154, thereby resulting in a pulse-forming action. This positive pulse is directly coupled to the base of transistor 165 by way of a series limiting resistor 164. The output from transistor 165 is normally at a positive level near +6 volts. The presence of a sudden burst in voice intensity is denoted by a negative-going pulse excursion to −6 volts. This excursion is applied by way of a controlling AND circuit 120*n*, line 148, to the input of a burst indication latch shown in FIG. 2*d*.

*Dual inverter*

The dual inverter 390 is designed to provide complementary output signals in response to an input signal supplied by a logic device; for example, the OR circuit shown in FIG. 19. The input signal is at approximately a 0-volt level to indicate an "ON" level input, whereas a −12 volt level is employed to indicate an "OFF" level input signal.

The dual inverter shown in FIG. 21 comprises an input divided network 391, a pair of transistors 392, 394 and a resistor diode network 393. In operation, when an OFF signal level of −12 volts is applied to the input network 391, transistor 392 is cut off while transistor 394 conducts. The collector of this transistor 394 assumes a −10 volt level which is applied to the output line 395. At the same time, the collector of transistor 392 assumes a 0-volt level that is applied to output line 396. When an "ON" signal level of 0 volts is applied to the input network 391, transistor 392 is turned on while transistor 394 is turned off. As a result, the collector of transistor 392 assumes a level of −10 volts which is applied to the output line 396 and, at the same time, the collector of transistor 394 assumes a 0-volt level which is applied to the output line 395. In this way, the dual inverter behaves as a connecting device between logic circuits by supplying complementary outputs as well as providing the proper low impedance current paths therebetween.

*Latch*

Formant storage and indication functions are provided by latches, a typical latch circuit 350 is shown in FIG. 17. Each latch comprises an input voltage coincidence network 351, a pair of transistors 353 and 356, and an indicator 358. Prior to its operation, a reset pulse is applied to the latch to restore it to a reset condition.

Following the reset pulse, both transistors 353 and 356 are cut off. The base of transistor 353 is held below −6 volts by the output, the collector of transistor 356. The latter is held off by a line 354 connected to the collector of transistor 353 which is near +6 volts. If both inputs 351*a* and 351*b* are near −12 volts, the base of transistor 353 is also near −12 volts. With one input at −12 volts and one at ground, the equivalent resistance of the input is 5K to −6 volts and, since a 10K resistor 352*a* in output line 352 connected to −12 volts limits current flow to about 0.4 milliampere in the 5K equivalent input resistance, there results a net drop of 2 volts below the −6 volt equivalent input voltage. This does not take into account the drop through diode 351*d* which will add somewhat to the cutoff voltage. Thus, with only one input on, the latch is maintained at cut off.

When both inputs are raised to about ground (0 volts), current flows in the base of transistor 353 to turn the latter on. The collector drops and turns on transistor 356, which raises its collector to near ground to cause the indicator lamp to light. The 10K resistor 352*a* from the output to the base of transistor 353 now provides enough base current to keep this transistor on, even though both inputs should drop to −12 volts. The isolating input diode 351*d* is back biased for this condition so that base current does not flow away from the base of transistor 353. Thus, the latch will stay on until reset.

When the Reset Key R is operated, a reset pulse from 0 volts to −12 volts is applied to the emitter of transistor 353, causing the latter to be cut off, the indicator lamp to be extinguished, and transistor 353 to be cut off. This raises the base of transistor 356 to +6 volts so that the transistor remains off when the common reset line returns to 0 volts. A delay means may be incorporated in the reset line, in the manner shown, to assure reset when power is applied. The latches are found in the FTS and IFD units for storing falling (F), rising (R) transients, as well as steady state (S) formants. The latches are also employed in the consonant matrix CMS to store vector characteristics representing the consonant sounds of the voice spectrum.

*Talk control trigger*

Figure 14:
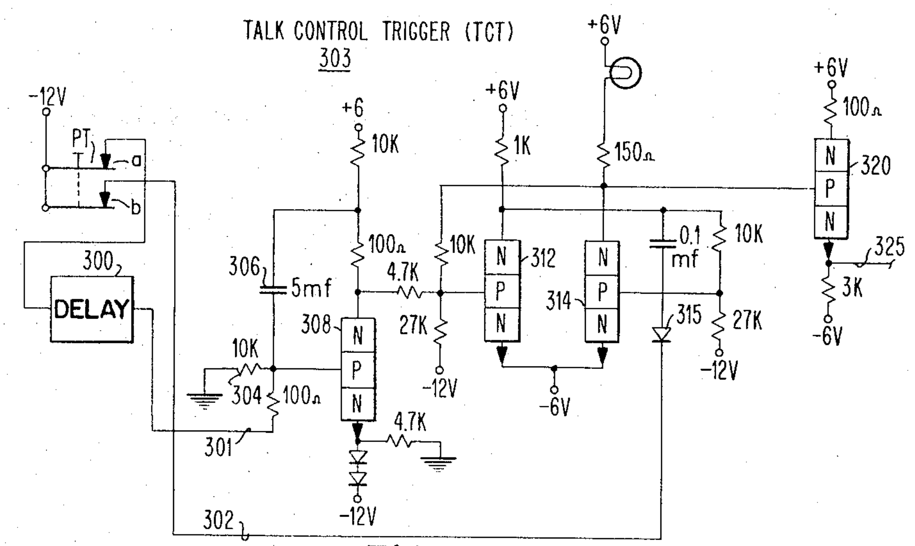
FIG. 14 shows the detail of the talk control trigger.

The talk control trigger 303, FIG. 14, is activated in response to the manual operation of a press-to-talk key PT during the time that words are spoken into the microphone 1 for recognition. The output from this trigger activates the gate line 325 connected to all the AND circuits 120 in the formant location system, thereby enabling all recognized formants, including the voice and fricative representing signals, to enter the formant transition detection means and the consonant matrix. No speech events are stored for recognition unless the talk control trigger is on.

Referring to FIG. 14, the talk control trigger 303 comprises essentially four transistors; namely, 308, 312, 314 and 320, and a timing capacitor 306 connected to the input circuit feeding the base of the transistor 308. These are all connected in the circuit network constituting the talk control trigger. The on and off controls to the trigger are connected to the press-to-talk key PT provided with a pair of normally closed contacts *a* and *b*. Interposed in the "ON" control circuit is a delay means 300 which provides protection against key clicks when the PT key is operated.

When the press-to-talk key is in its normal position, transistor 308 is held off and the 5-microfarad delay capacitor 306 is fully charged. Transistor 314 is also cut off by virtue of the negative bias applied via the closed "*b*" contacts of the PT key, line 302 and diode 315, which holds the base of the transistor 314 to near −12 volts. Transistors 312 and 320 are conducting by reason of their connections to the collectors of transistors 308 and 314, respectively. The output of the talk control trigger is thus held near +6 volts, which is the "OFF" level for the inputs to the NAND circuits it controls.

When the press-to-talk key PT is depressed, the timing capacitor 306 begins to discharge through the 10K resistor 304 to ground. The diode clamp to the base of transistor 314 is also released. However, the transistor 314 remains cut off as long as transistor 312 conducts. After an interval of about 50 milliseconds, transistor 308 conducts and cuts off transistor 312, causing its collector to rise, thereby causing transistor 314 to conduct current through indicator lamp 316 and also cut off transistor 320. The output on line 325 now drops to the negative "ON" level near −6 volts. All negative AND circuits connected to the line 325 are now gated with this negative level. At the end of the spoken word, and upon release of the key PT, the base of transistor 314 is clamped to −12 volts, causing its collector to rise to cause transistor 320 to conduct to raise the output in the line 325 to near +6 volts. This action deactivates all the NAND circuits and permits the timing capacitor to charge through the 100-ohm resistor to −12 volts.

*Delay circuit*

Figure 2B:
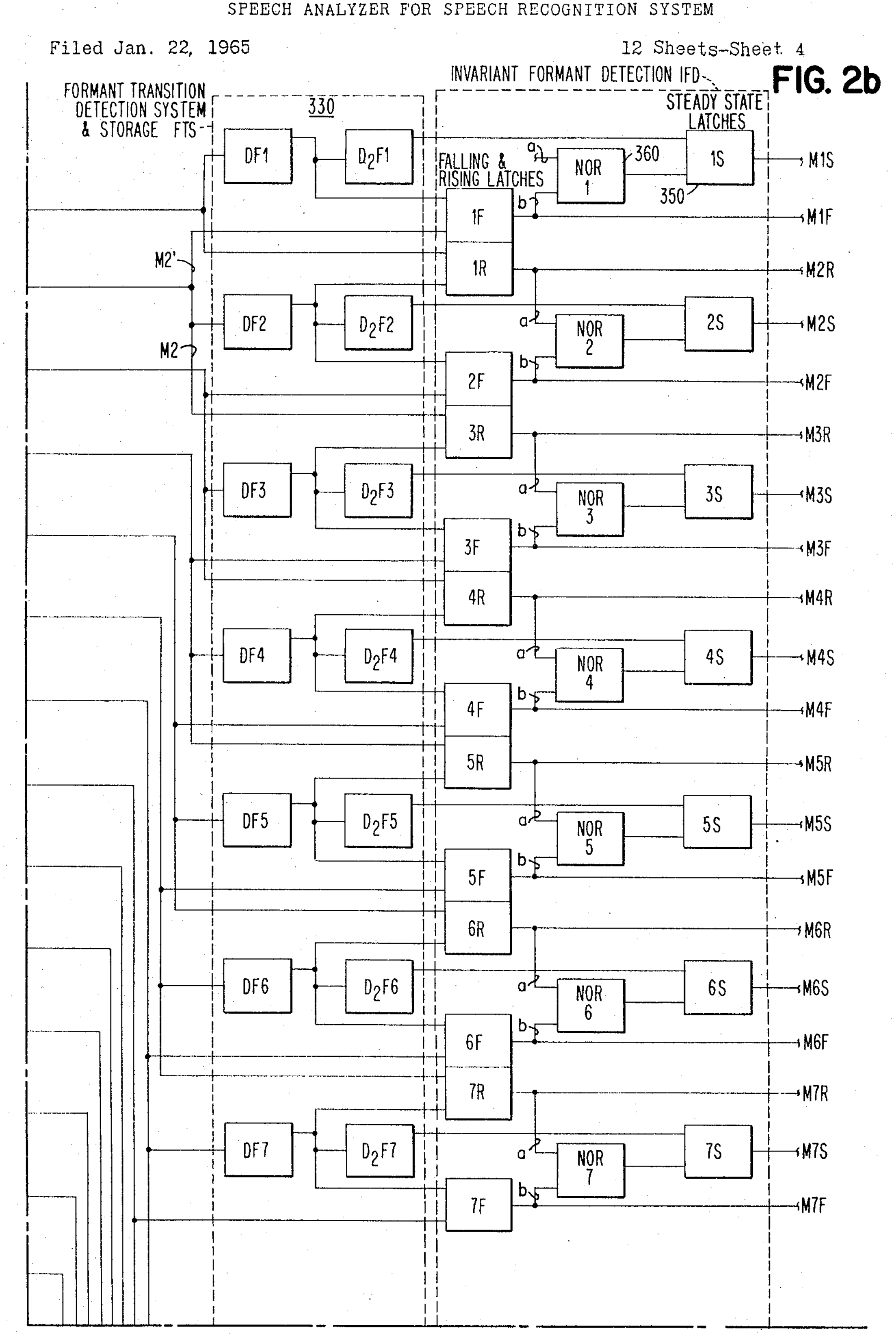

This circuit, shown at the bottom of FIG. 2*b*, provides a 1-second delay in restoring the reset circuit to the latches when power is applied. All voltages will be at normal value and latches will be off when the reset circuit is completed. Thus, it is assured that all storage latches will be off when power is applied.

*Operation of the system*

Figure 2C:
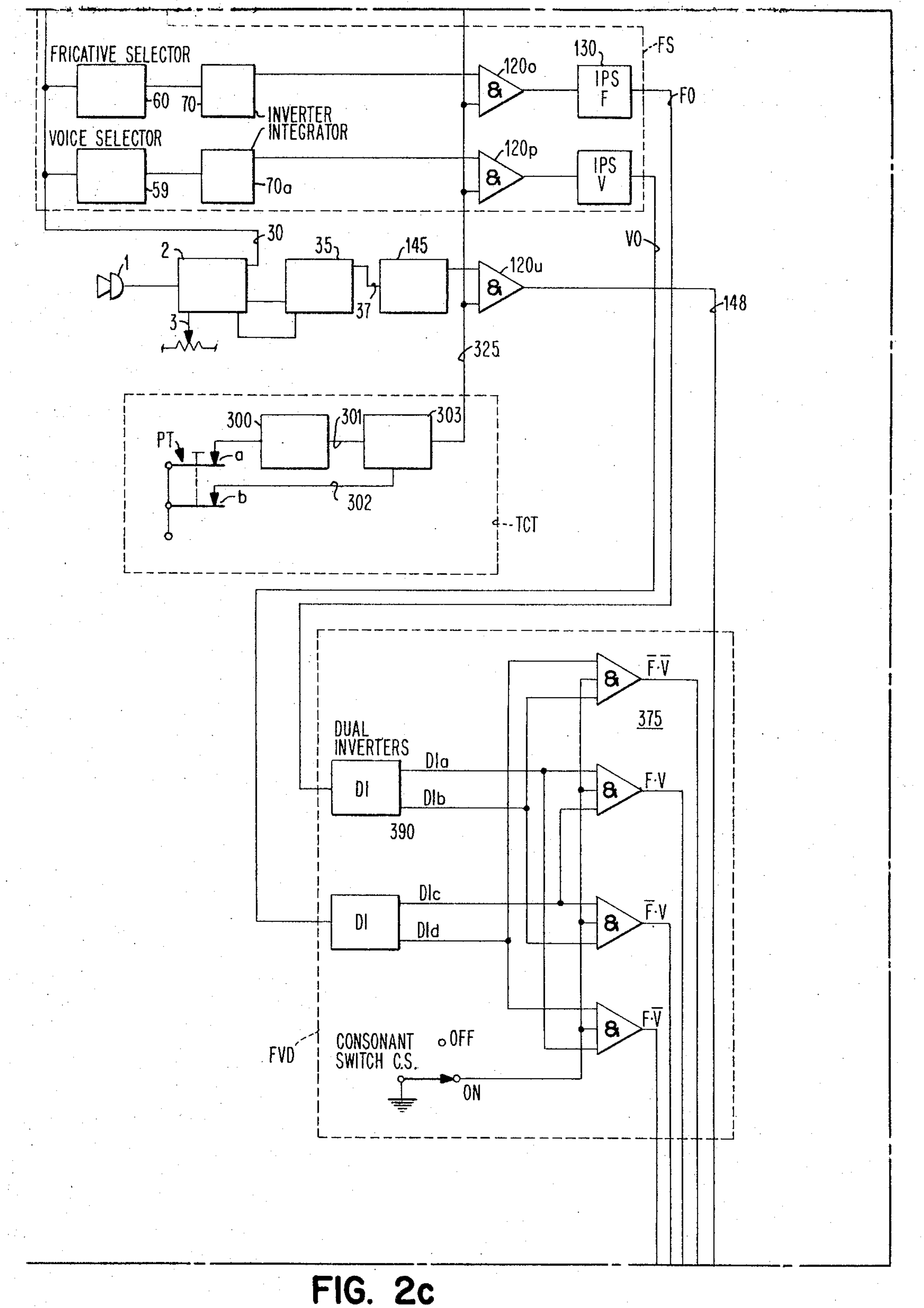

The system is set into operation when the operator depresses the press-to-talk key PT, shown in FIG. 2*c*. This key action turns on the talk control trigger (TCT) 303 to supply a gate signal on the line 325 connected to all of the AND circuits 120*a* through 120*n*, seen in FIG. 2*a*, and also the AND circuits 120*o*, 120*p* and 120*r*, shown in FIG. 2*c*. When sound energy generated by the voice of the operator, or from some other source, passes through the microphone 1, the sound energy is fed through the pre-amplifier 2 which provides a compressed speech envelope which, as a result of the dynamic action of the automatic gain control unit (AGC) 35, is at a constant level. This compressed speech envelope is applied to the frequency selectors FS in FIG. 2*a* wherein the 14 frequency selectors, referenced 80, are each tuned to detect a specific band of frequency lying in the range of 3,750 to 260 c.p.s. In addition, the compressed speech envelope is applied to the fricative selector 60 and the voice selector 59, also shown in FIG. 2*c*, which yield inverted integrated outputs when the respective fricative and voice frequencies are present in the speech spectrum. The outputs provided by the frequency selectors in response to the detection of the presence of particular frequency bands are fed from the respective frequency selectors to appropriate output lines; for example, line 95, to the formant location system FL, shown in FIG. 2*a*.

As previously explained, the formant location system employs three basic units: the rectifiers 100, the balance detectors 110 and the AND circuits 120. From a visual inspection of the arrangement of the rectifiers and the balance detectors, it can be seen that the presence of formants; that is, energy peaks of a particular frequency band, will appear on the outputs of the balance detectors 110, of which there are 13 in all in the instant embodiment. Considering, for the moment, balance detector BD2, the top line, reference R2>R3, issues a negative signal level when the quantity R2 (the output from rectifier 2) is greater than R3 (the output from rectifier 3). Conversely, when quantity R3 is greater than R2, the lower line, which is identified R3>R2, issues a negative signal level from the balance detector BD2. When, however, the inputs to the balance detector BD2 are of the same magnitude, no negative signals appear on either of the output lines in question. Whenever a local maximum is present, a pair of output lines will have a coincidence of negative signals which causes the associated AND circuit in the group, referenced 120*a* through 120*n*, to pass said output through the particular AND circuit in question to its associated integrating pulse shaper 130, 14 of which are employed and referenced IPS1 through IPS14. The function of the integrating pulse shaper is to remove undesirable transients, which may appear in the applied waveform representing the presence of a formant in the speech spectrum.

At the outputs of the various integrating pulse shapers, the formant energy of the spectrum includes both the vowel characteristics and the consonant characteristics. Now to be considered is an explanation of how vowel characteristics indicative of falling transients, rising transients and invariant (steady state) formants are detected.

Figure 2D:
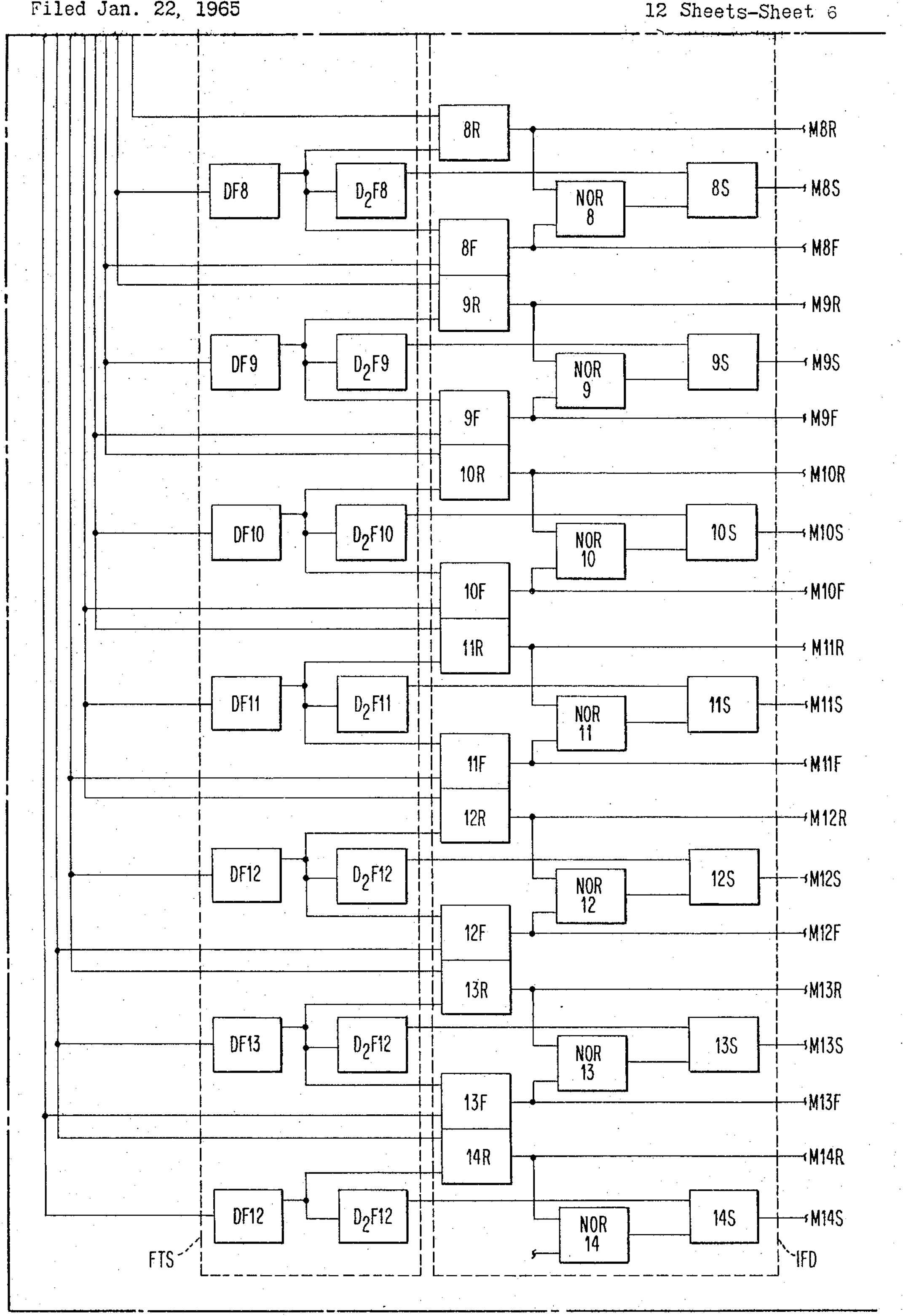

The detection of the rising and falling transients is accomplished by means of the differentiators DF1 through DF14 in conjunction with the falling and rising latches 350, shown in FIGS. 2*b* and 2*d*. The invariant formants; that is, the steady state formants, are detected and stored by the differentiators $D_2F1$ through $D_2F14$ in conjunction with the NOR circuits 360 and the steady state latches 350, also seen in FIGS. 2*b* and 2*d*.

The detection of a falling or rising transient may best be described by considering the activity of an upper frequency band or a lower band adjacent a given frequency band. A rising transient is defined as that transient detected in a frequency band immediately above a given frequency band within which is detected a formant termination. Conversely, a falling transient is defined as that transient detected in a lower frequency band immediately adjacent a given frequency band in which is detected a formant termination.

In order to explain the precise action of the above conditions, consider, in FIG. 2, as a reference, the integrating pulse shaper 2 output line M2 on which is detected the termination of a local maximum (i.e., a formant) which local maximum is related to the given frequency (i.e., the assumed reference frequency), detected by the frequency selectors FS2. The line M2, as seen in the drawing, is connected to the upper input of the latch 2R and also, by way of branch line M2′, to the lower input of the latch 1F and also to the input of DF2. Assuming further that a rising transient is occurring on the line M1 at the time that the local maximum on the line M2 is terminating, it follows that the rising transient on the line M1 is transmitted to the upper input to the latch 1R, impressing thereon a 0 voltage level. As a consequence, to the termination of the local maximum on the line M2, a −12 volt signal level is applied to the input of the differentiator DF2, causing an output of 0 volt to be impressed on the output line DF2*a*. This output is maintained for an interval of 35 milliseconds, as may be appreciated from the timing diagram shown in FIG. 16*b*. The output of 0 volt also is applied to the lower input to the latch 1R. The presence of 0 volt on both the upper and lower inputs to the latch 1R causes the latter to turn on, in the manner earlier described. The turning on of the latch 1R causes the latter to issue a signal on the output line M2R to indicate one of the vowel characteristics for a rising transient.

To explain the action of a falling transient relative to the termination of a local maximum on the line M2, consider the occurrence of a transient on the line M3 (with no action occurring on the line M1), at a time when the local maximum is terminating on the line M2. Based upon these considerations, it follows that a 0-volt level is impressed on the lower input to the latch 2F. At approximately the same time, the output on the line DF2*a* also applies a 0-volt level to the upper input to the latch 2F. As a result, the latch 2F turns on to issue an output on the line M2F, indicating a vowel characteristic having a falling transient.

To explain the action of a steady state condition, wherein an invariant formant exists, consider the absence of a transient on either of the lines M1 and M3 at a time when a local maximum is terminating on the line M2. Under these conditions, lines M3 and M1 impress a −12 volt level signal upon the lower input to the latch 2F, as well as upon the upper input to the latch 1R. The remaining inputs to these two latches are maintained at an 0 potential level for a period of 35 milliseconds by virtue of the time constant of the differentiator DF2. Since but one input to each of these latches 1R and 2F is at 0 volts, turning on of these latches is thus prevented. The expiration of the 35-millisecond pulse from the differentiator DF2 causes differentiator $D_2F2$ to issue a 5 millisecond pulse to the top input of the latch 2S which is used for storing the invariant formant condition. The lower input to this latch is connected to the output of the NOR2 circuit which has its inputs *a* and *b* respectively connected to the outputs respectively of the latches 1R and 2F, which, as earlier described, are both off at this time. Since neither input to the NOR2 circuit is energized, the negative 60-millisecond inhibit pulse is not generated, resulting in a 0 voltage level being applied to the lower input to the latch 2S. At the same time, a 0 voltage level is applied to the other input to this latch, thereby providing a condition for turning on of the latch 2S. The output from this latch is applied to the line M2S which indicates a steady (i.e., the invariant) condition characteristic for one of the vowels in the speech spectrum.

In this manner, the present embodiment provides 14 invariant characteristics M1S through M14S, 13 falling transient characteristics M1F through M13F and 13 rising transient characteristics M2R through M14R, thus providing a total of 40 vectors, on appropriately identified lines in FIGS. 2*b* and 2*d*, which comprise the vowl characteristics in the speech spectrum.

Figure 2E:
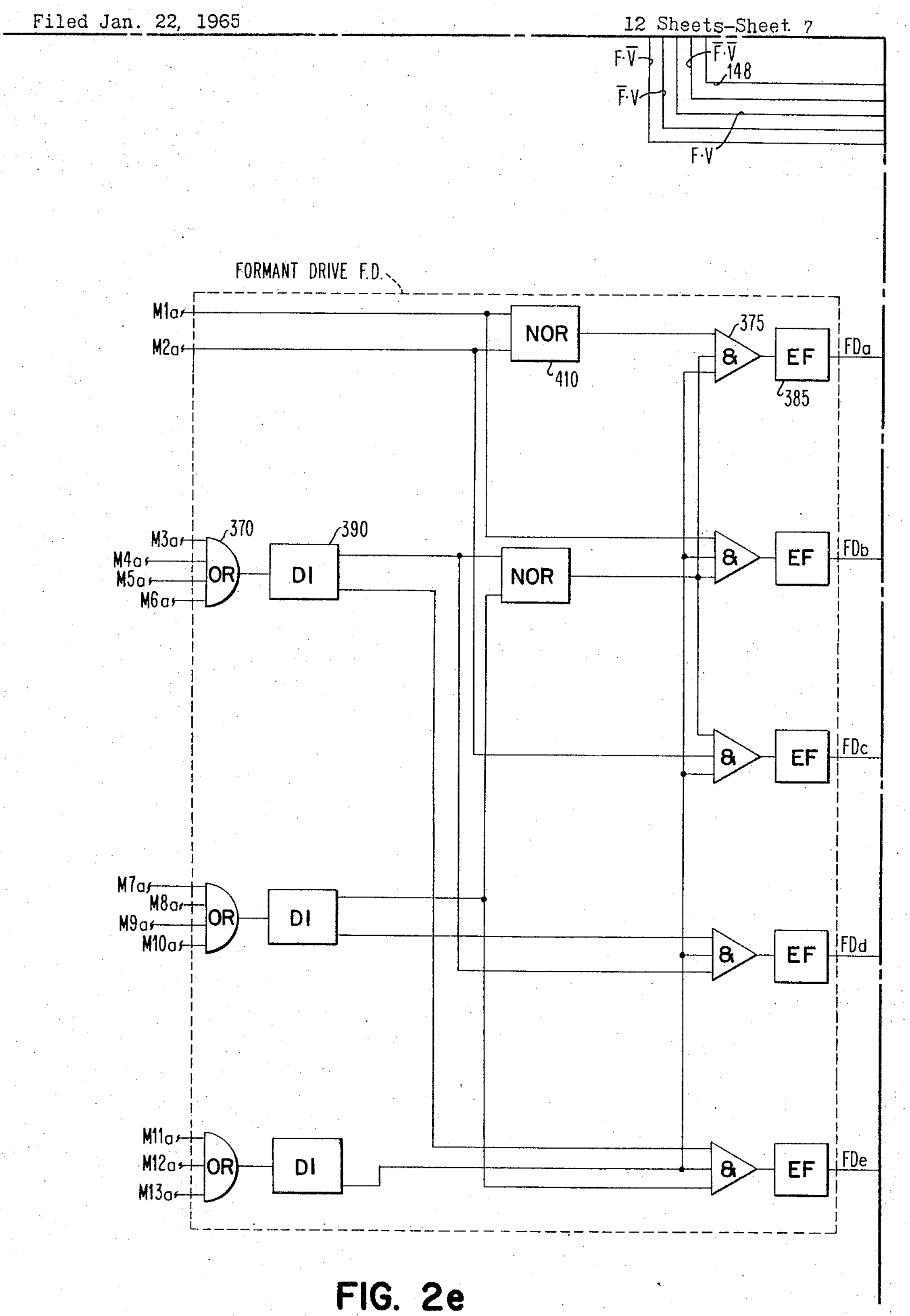
Figure 2F:
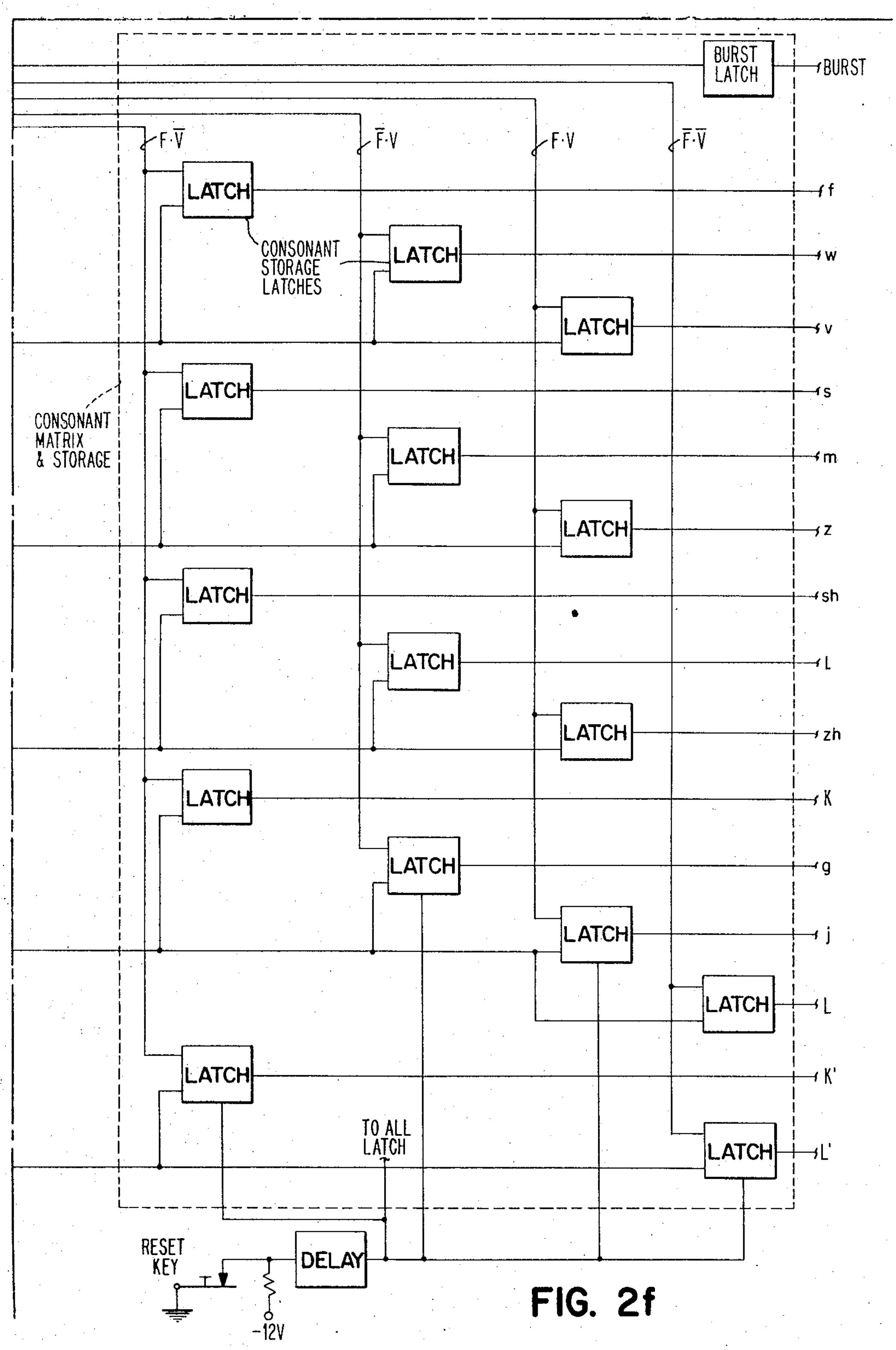

The development of the consonant characteristics will now be described. The consonant characteristics are developed from the formants issued by the formant location system FL, seen in FIG. 2*a*, providing formant outputs on the lines M1 through M14. These formants are transmitted by way of branch lines M1*a* through M13*a* connected to the formant drive FD, seen in FIG. 2*e*. The formant drive includes the OR circuits 370, the dual inverters (DI) 390, the AND devices 375 and the emitter-followers 385 and the NOR devices 410. These devices are connected in the manner shown to five output lines identified FD*a*, FD*b*, FD*c*, FD*d* and FD*e*. These outputs are combined with the four consonant classes coded $\overline{F}\cdot\overline{V}$, $F\cdot V$, $\overline{F}\cdot V$, and $F\cdot\overline{V}$, which are transmitted on appropriately identified lines connected to the input of the consonant matrix storage means CMS, as seen in FIG. 2*f*. These four coded outputs are developed by the fricative voice driver FVD, seen in FIG. 2*c*. These coded outputs are derived from the fricative and voice energies issued respectively on the lines FO and VO, seen in FIG. 2*c*. The latter lines are connected specifically to a pair of dual inverters 390, each providing complementary outputs, in the manner previously described, to four lines DI*a*, DI*b*, DI*c*, and DI*d*, connected in the manner shown to four AND circuits whose outputs are identified $\overline{F}\cdot\overline{V}$, $F\cdot V$, $\overline{F}\cdot V$, and $F\cdot\overline{V}$. The AND circuits in the fricative and voice driver FVD are gated by a common drive means connected to a consonant switch CS. These four coded classes, as previously mentioned, represent the four major consonant classes; namely:

(1) fricatives and sibilants—f, s, sh, k, t, ch;
(2) voiced or liquid consonants—w, b, g, m, l, y;
(3) voiced fricatives—v, z, zh, j, dj, d; and
(4) unvoiced aspirates—h, soft-k, p.

These four conditions of fricative and voice energies are combined with the formants generated on the lines M1*a* through M13*a* by means of the consonant matrix storage means CMS to provide 15 consonant characteristics on appropriately identified output lines; namely: *f, w, v, s, m, z, sh, l, zh, k, g, j, h, k'* and *h'*. The present embodiment thus provides 15 consonant characteristics, 40 vowel characteristics, including a burst characteristic, yielding a total of 56 characteristics to provide a complete history of the voice in the speech spectrum.

As an example of the method of describing vowel action by means of vectors, consider the vowel *"i."* This is a compound vowel, pronounced as "ah - - ee," and is represented in the present system by a vector code of nine bits represented by the following: M2F, M3S; M5S, M6R, M7R; M9F, M10F, M11S; M13S.

This is the unique code for the vowel *"i,"* as pronounced above, and an analysis thereof reveals the formant action to be as follows:

(1) The lowest formant frequency is steady throughout and is indicated by vestor M13S.

(2) The next higher formant begins at M9 and drops through two frequency bands to M11 where it terminates, all of which are indicated by the vectors M9F, M10F, M11S.

(3) The next following higher formant begins at M7 and rises through two frequency bands to M5 where it terminates, this being indicated by the vectors M7R, M6R, M5S.

(4) The highest formant starts in M2 and drops to M3 where it remains steady as indicated by the vectors M2F, M3S.

Thus, with nine bits of information, a fairly complicated vowel action is described; but more importantly, a unique code is produced to provide a complete history of the vowel action.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for analyzing waveforms of a sound spectrum comprising:
   (a) a plurality of waveform analyzers, each providing an output whose amplitude is a function of the energy present in the waveforms analyzed;
   (b) peak energy detecting means responsive to the energies present in the adjacent waveforms analyzed to provide local maxima signals, one for each local maximum detected;
   (c) a transition system for detecting peak energy transitions occurring between adjacent waveforms;
   (d) an invariant energy detection system interconnected with said transition system for detecting the absence of transients and the presence of the invariants; and
   (e) means connectively associated respectively with said transition system and said invariant detection system for manifesting detected transitions and the invariants in the form of appropriately coded bit signals.

2. A system for analyzing frequencies of a sound spectrum comprising:
   (a) a plurality of frequency analyzers, each responsive to a particular frequency band present in the spectrum and each providing an output whose amplitude is a function of the energy present in the frequencies analyzed;
   (b) fricative and voice sound analyzers tuned respectively to the fricative and voice sound frequencies present in the spectrum, including means to provide appropriate fricative and voice output signals;
   (c) formant energy detecting means responsive to the energies present in adjacent frequency bands analyzed to provide formant signals, one for each formant detected;
   (d) a formant transition system for detecting peak energy transitions occurring between adjacent formant signals;
   (e) means for manifesting detected formant transitions in the form of coded bits, each representing a particular and meaningful characteristic of a vowel sound in the spectrum;
   (f) a fricative and voice sound matrix responsive to said fricative and voice output signals to provide fricative and voice coded signals representing different classes of fricative and voice energies present and absent in the sound spectrum; and
   (g) a constant matrix jointly responsive to said formant signals and said fricative and voice coded signals to provide coded signals characteristic of the consonant sounds in the sound spectrum.

3. A system for analyzing frequencies of a sound spectrum comprising:
   (a) a plurality of frequency analyzers, each responsive to a particular frequency band present in the spectrum and each providing an output whose amplitude is a function of the energy present in the frequencies analyzed;

(b) fricative and voice sound analyzers tuned respectively to the fricative and voice sound frequencies present in the spectrum, including means to provide appropriate fricative and voice output signals;

(c) formant energy detecting means responsive to the energies present in the adjacent frequency bands analyzed to provide formant signals, one for each formant detected;

(d) a formant transition system for detecting peak energy transitions occuring between adjacent formant signals;

(e) an invariant energy detection system interconnected with said formant transition system for detecting the presence of invariants, including means for manifesting the invariants in the form of coded bit signals;

(f) means for manifesting detected formant transitions in the form of coded bits, each representing a particular and meaningful characteristic of a vowel sound in the spectrum;

(g) a fricative and voice sound matrix responsive to said fricative and voice output signals to provide fricative and voice coded signals representing different classes of fricative and voice energies present and absent in the sound spectrum; and (h) a consonant matrix jointly responsive to said formant signals and said fricative and voice coded signals to provide coded signals characteristic of the consonant sounds in the sound spectrum.

4. A system as in claim 3 in which said formant transition detection means constitutes:

(a) a network which includes a plurality of first differentiating means connected, one to each different formant transmission line, and each being responsive to a formant termination to provide a differentiated output signal on an output line thereof, each such output line being associated with a particular frequency band of the spectrum;

(b) a plurality of rising transient storage means;

(c) a plurality of falling transient storage means;

(d) each of said transient storage means having an output and a pair of inputs responsive to a coincidence of input signals;

(e) one each of said rising and falling transient storage means being connectively paired with a different one of the differentiated output lines providing a parallel arrangement wherein any one differentiated output line represents a frequency band between an adjacent upper frequency band and an adjacent lower frequency band of the spectrum; and (f) either a rising or a falling transient storage means of each pair of storage means being responsive to a coincidence of input signals constituted of an associated differentiated output signal and either a rising or a falling transient signal associated with an adjacent frequency band, depending respectively upon whether a rising or falling transient occurs, to store a manifestation of the appropriate transient.

5. A system as in claim 4 in which said invariant detection system comprises:

(a) a plurality of second differentiating means having inputs connected respectively to the outputs of said first differentiating means and each responsive to a first differentiated output signal to provide a second differentiated output signal;

(b) a plurality of comparing means, each having a pair of inputs and an output, each pair of inputs connected to a different pair of transient storage outputs respectively associated with a rising transient storage means and a falling transient storage means, said comparing means providing a steady state output signal in response to the absence of both a rising transient and a falling transient in the associated storage means; and (c) a plurality of invariant condition storage means, each responsive to a coincidence of a second differentiated output signal and a steady state output signal for storing and manifesting an invariant sound characteristic.

6. A system as in claim 5 in which said plurality of comparing means comprises a plurality of logical NOR circuits.

7. A system as in claim 6 in which the second differentiated output signal is approximately one-seventh the time duration of the first differentiated output signal, which is about 35 milliseconds in duration.

8. A system for analyzing speech frequencies generated by the vocal mechanism of a human being comprising:

(a) a plurality of frequency analyzers, each providing an output whose amplitude is a function of the energy present in the frequencies analyzed:

(b) controllable formant detecting means responsive to the energies present in the adjacent frequencies analyzed to provide local maxima signals, one for each local maximum detected;

(c) a transition system for detecting formant transitions occurring between adjacent frequencies;

(d) an invariant energy detection system interconnected with said transition system for detecting the absence of transients and the presence of the invariants;

(e) means connectively associated respectively with said transition system and said invariant detection system for manifesting detected transitions and the invariants in the form of appropriately coded bit signals; and (f) a talk control means interposed in said formant detecting means and operated by the human being to render the formant detecting means operable for formant detection.

9. A system for analyzing frequencies of a sound spectrum having an approximate range of 100 c.p.s. to 10,000 c.p.s. comprising:

(a) a plurality of frequency analyzers, each responsive to a particular frequency band of a plurality of bands occupying an approximate spectrum range of between 250 c.p.s. and 4,000 c.p.s., and each analyzer providing an output whose amplitude is a function of the energy present in the frequency band analyzed;

(b) fricative and voice sound analyzers tuned respectively to the fricative and voice sound frequencies present in the spectrum, the fricative analyzer being responsive to the frequencies having an approximate range of between 4,000 c.p.s. and 10,000 c.p.s., and the voice sound analyzer, to a frequency range of between 100 c.p.s. and 250 c.p.s., including means to provide appropriate fricative and voice output signals;

(c) formant energy detecting means responsive to the energies detected in adjacent frequency bands to provide formant signals on appropriate lines of a plurality of formant transmission lines;

(d) a formant transition system connected to said formant transmission lines, for detecting peak energy transitions occurring between formant signals appearing on adjacent ones of said transmission lines;

(e) an invarient energy detection system interconnected with said formant transition system for detecting the presence of invariants, including means for manifesting the invariants in the form of coded bit signals;

(f) means for manifesting detected formant transitions in the form of coded bits, each representing a particular and meaningful characteristic of a vowel sound in the spectrum;

(g) a fricative and voice sound matrix responsive to said fricative and voice output signals to provide fricative and voice coded signals representing four different classes of fricative and voice energies; namely, $F\cdot\overline{V}$, $\overline{F}\cdot V$, $F\cdot V$, and $\overline{F}\cdot\overline{V}$; and (h) a consonant matrix jointly responsive to prearranged combinations of said formant signal and said classes of fricative and voice coded signals to provide coded signals characteristic of the significant consonant sounds in the sound spectrum.

References Cited

UNITED STATES PATENTS

| | | | |
|---|---|---|---|
| 2,938,079 | 5/1960 | Flanagan | 179—1 |
| 3,215,934 | 11/1965 | Sallen | 179—1 |
| 3,238,303 | 3/1966 | Dersch | 179—1 |

KATHLEEN H. CLAFFY, *Primary Examiner.*

R. P. TAYLOR, *Assistant Examiner.*

Disclaimer 3,368,039.—*Genung L. Clapper*, Vestal, N.Y. SPEECH ANALYZER FOR SPEECH RECOGNITION SYSTEM. Patent dated Feb. 6, 1968. Disclaimer filed Oct. 30, 1972, by the assignee, *International Business Machines Corporation.*

Hereby enters this disclaimer to claims 1 and 8 of said patent.

[*Official Gazette January 2, 1973.*]